United States Patent [19]

Wagner et al.

[11] Patent Number: 5,069,857

[45] Date of Patent: Dec. 3, 1991

[54] PROCESS FOR THE PRODUCTION OF MOLDED ARTICLES BY DEEP-DRAWING PREFABRICATED POLYURETHANE(UREA) PARTS OR BY PRESSING FRAGMENTED POLYURETHANE(UREA) MATERIAL

[75] Inventors: Joachim Wagner, Cologne; Thomas Elsner, Duesseldorf; Werner Rasshofer, Cologne; Jürgen Faehndrich, Leverkusen; Eberhard Jürgens, Cologne, all of Fed. Rep. of Germany

[73] Assignee: Bayer Aktiengesellschaft, Bayerwerk, Fed. Rep. of Germany

[21] Appl. No.: 605,600

[22] Filed: Oct. 29, 1990

[30] Foreign Application Priority Data

Nov. 1, 1989 [DE] Fed. Rep. of Germany ....... 3936294
Sep. 25, 1990 [DE] Fed. Rep. of Germany ....... 4030282

[51] Int. Cl.$^5$ .............................................. B29C 51/42
[52] U.S. Cl. .................................... 264/544; 264/548; 264/320; 264/336
[58] Field of Search ............... 264/544, 548, 550, 552, 264/291, 292, 320, 322, 336

[56] References Cited

U.S. PATENT DOCUMENTS

| | | | |
|---|---|---|---|
| 2,760,233 | 8/1956 | Bjorksten | 264/544 |
| 4,125,526 | 11/1978 | McCready | 264/552 |
| 4,250,137 | 2/1981 | Riedler | 264/554 |
| 4,935,187 | 6/1990 | Vente et al. | 264/336 |

FOREIGN PATENT DOCUMENTS

0310896 9/1988 European Pat. Off. .
0334171 3/1989 European Pat. Off. .

*Primary Examiner*—Jill L. Heitbrink
*Attorney, Agent, or Firm*—Joseph C. Gil

[57] ABSTRACT

The invention is directed to a process for the production of molded articles by deep-drawing a prefabricated polyurethane(urea) part produced from a polyisocyanate polyaddition product having a specific gravity of at least 0.8 g/cm$^3$. The part is placed inside a deep-drawing mold and pressed at a temperature of up to 230° C. and a pressure of up to 1,000 bar. After the deep-drawing process, the part is subjected to a dwell time of at least 10 seconds at a temperature of up to 230° C. and a pressure of up to 1,000 and is immediately thereafter removed from the mold.

3 Claims, No Drawings

PROCESS FOR THE PRODUCTION OF MOLDED ARTICLES BY DEEP-DRAWING PREFABRICATED POLYURETHANE(UREA) PARTS OR BY PRESSING FRAGMENTED POLYURETHANE(UREA) MATERIAL

BACKGROUND OF THE INVENTION

The present invention is directed to a process for the production of molded articles by deep-drawing (forming by suction) prefabricated polyurethane(urea) parts or by pressing fragmented polyurethane(urea) materials. The polyurethane(urea)s are based on polyisocyanate polyaddition products having a specific gravity of at least 0.8 g/cm$^3$. The prefabricated part is placed in a deep-drawing mold or the fragmented material is introduced into a casting mold. In either case, the material is then pressed at a temperature of up to 230° C. and a pressure of up to 1000 bar and preferably up to 300 bar.

A similar method has been employed (see European Patents 334,171 and 310,896) for producing molded articles by deep-drawing polyurethane(urea) parts, optionally reinforced with glass fibers, which had been previously produced by the reaction injection molding ("RIM") process. The deep-drawn articles thus produced were subsequently cooled down under pressure in the deep-drawing mold before they were removed from the mold. This procedure requires very long operating cycles due to the long cooling times required, especially for the production of large articles.

The problem thus arises of improving the known process so that the cycle times are reduced.

DESCRIPTION OF THE INVENTION

A solution to the above noted problem is achieved by subjecting the molded product to a dwell time of at least 10 seconds at a pressure of up to 1000 bar, and preferably up to 300 bar after the deep drawing or pressing process, while maintaining the existing temperature, and then immediately removing the product from the mold. In this new process, therefore, in which the product is removed from the mold while hot, the procedure of cooling inside the deep-drawing mold or the pressing mold under pressure is dispensed with, and it is only after its removal from the mold that the product is cooled. It has been surprisingly found that when this procedure is adopted, molded products which are free from after-shrinkage are obtained within considerably reduced cycle times. This is contradictory to what would have been expected in the art.

In general, the lower temperature is about 100° C., while the preferred temperature range is between 160° and 190° C., with the most preferred range being between 180° and 190° C. The total dwell time is preferably from 1 to 10 minutes, and is most preferably from 3 to 5 minutes.

The polyisocyanate polyaddition products used are of the kind which have been prepared by the reaction of
a) aromatic polyisocyanates,
b) compounds having a molecular weight from 1,800 to 12,000 and containing on statistical average at least 2.5 isocyanate reactive groups,
c) optionally, diamines having molecular weights of from 108 to 400 and having two primary and/or secondary aromatically bound amino groups,
d) optionally, one or more compounds which may contain ether groups, which have molecular weights of from 60 to 1,799 and which are selected from the group consisting of alkane polyols, cycloalkane polyols, alkane polyamines, and cycloalkane polyamines,
e) optionally with the addition of known auxiliary agents and additives used in polyurethane(urea) chemistry by a single stage or multistage process in which an isocyanate index of from 60 to 140 is maintained, with the proviso that at least one of the components c) or d) is used in a quantity such that the total quantity of components c) and d) amounts to at least 5% by weight, based on the weight of component b).

The auxiliary agents and additives e) optionally used in the preparation of the polyisocyanate polyaddition products may be, for example, internal mold release agents, catalysts for the polyisocyanate polyaddition reaction, blowing agents, surface active additives, cell regulators, pigments, dyes, flame retardants, stabilizers, plasticizers or fungistatic or bacteriostatic substances such as those described, for example, in Belgian Patent 081,701, column 6, line 40 to column 9, line 31. Included among the preferred auxiliary agents and additives optionally used are the fillers and reinforcing agents known per se, such as barium sulphate, kieselguhr, whiting, mica and in particular glass fibers, liquid cyrstalline fibers, glass flakes, glass spheres or microspheres and carbon fibers. These fillers and reinforcing materials may be added in quantities of up to 80% by weight, preferably up to 30% by weight, based on the total weight of the filled or reinforced polyisocyanate polyaddition products.

The starting materials for the process according to the invention can be in the form of semifinished products, for example, in sheet form or in the form of small or very small fragments.

Suitable sheet form products include laminates containing fillers and reinforcing materials; details of the layered structure of such laminates can be found in German Offenlegungsschrift 3,208,524, page 12, line 31 to page 14, line 13.

If the starting materials are employed in fragmentized form, they can be in the form of granules, chips, flakes and/or other small or very small fragments. It is particularly preferred, before carrying out the process according to the invention, to fragmentize the polyisocyanate polyaddition products in suitable devices to form small or very small fragments of a maximum particle size of 10 mm preferably less than 6 mm. Suitable methods of fragmentization are, for example, cutting processes, or tearing, chopping or granulating processes, of the kind known to those skilled in the art. Suitable devices for fragmentization are commercially available. Particularly suitable devices are, for example, cutting mills with rotating knives, followed by screening. Such devices are obtainable, for example, from the Pallmann Company, D-6660 Zwciknücken, or from the Weise Company, D-6340 Dillenburg, both located in Germany.

If the polyisocyanate polyaddition products are employed in the form of fragmentized material, auxiliaries and reinforcing materials can also be used. Suitable auxiliaries and reinforcing materials include lignin, cellulose and lignocellulose fibers; fragmentized natural or synthetic rubbers; barium sulfate, kieselguhr, whiting, mica or in particular glass fibers, liquid crystalline fibers, glass flakes, glass beads and metal or carbon fibers. Particularly preferred materials are, however, sheet-like fillers, such as mats of different weights per unit area, knitted materials, braided materials, woven materials, non-woven materials, nettings, meshes and lattices, and the like, made of glass, carbon fibers, liquid crystalline fibers, polyamide and aramide fibers, and also made of inorganic materials, such as, for example, carbides; and metals such as aluminum, steel or copper.

In carrying out the process according to the invention the above reinforcing components are generally used in quantities of up to 90% by weight, preferably 20 to 90% by weight, based on the total weight of the system.

The procedure for carrying out the process according to the invention, i.e., the processing of the polyisocyanate polyaddition products by subjecting them to the pressure and heat can be effected with the aid of any desired, known apparatus, such as for example, deep-drawing process. However, in carrying out the process according to the invention, the material not melted, as is known from "thermoplastic" resins in the true sense; at no time does any liquid, relatively low viscosity, macroscopic phase occur. Suitable methods of thermoforming are known and are described, for example, in H. Käufer in "Maschinenmarkt" 88 (1982), Vogel-Verlag, D-Würzburg, pages 1062 to 1071.

The process according to the invention allows the production of molded articles in the form of hollow bodies, beakers, containers of various dimensions and capacities; covers for instrument panels and control panels, steering column covers; flat vehicle body parts, such as door panels, body panels, wings or engine bonnets or boot lids, as well as wheel covers, seat bases or backrests. In sheet form the products of the process according to the invention can also be used as desk mats, display boards with magnetic clips, adhesive labels, protective films and coverings for the most diverse purposes. The products of the process according to the invention can also be used in the form of seat bases, backrests, boxes, beakers, non-expandable suitcases and similar containers; components for vehicle bodies; stiffening elements, profiled sections, such as for example, frames and supports; stiff external vehicle body parts such as wings or engine bonnets or boot lids, wheel covers, wheel housing toris, stiffening elements for protective and decorative shields, vehicle inside door linings, doors, flaps, inside roof linings and similar articles. They can also be pressed together with wood and similar materials for use in vehicle interiors. They are also suitable for articles for leisure activities.

Products of the process according to the invention can also be used in the form of small molded articles such as keyboard elements, hard elastic sealing elements and packing rings, recessed grips and gripping elements, small damping elements or lockup washers or spacing washers, and also for stiffened or non-stiffened profiled sections for cable ducts and sealing lips or for any other solid small parts.

The invention is further illustrated but is not intended to be limited by the following examples in which all parts and percentages are by weight unless otherwise specified.

EXAMPLES

Example 1

A plate measuring 350×350×4 mm was prepared from the following formulation by the RIM process:

Polyisocyanate component: an isocyanate semi-prepolymer having an NCO content of 19% prepared by the reaction of an excess quantity of uretonmodified 4,4'-diisocyanatodiphenylmethane having an NCO-content of 30 % with a polyester-polyol with OH number 56 based on adipic acid and a mixture of equal parts by weight of ethylene glycol and 1,4-dihydroxybutane.

Aminopolyether: The aminopolyether used in the following example has an NH number of 44 and was obtained by hydrolysis of the isocyanate groups of an isocyanate prepolymer having an NCO content of 3.4%. The isocyanate prepolymer in turn was obtained by the reaction of 2,4-/2,6-diisocyanatotoluene (ratio of isomers 80:20) with a polyether mixture of OH number 50. This polyether mixture consisted of A) a polyether with OH number 35 prepared by the propoxylation of glycerol followed by the ethoxylation of the propoxylation product (PO:EO ratio by weight=87:13) and B) a polyetherpolyol with OH number 56 and an OH functionality of 2.5 prepared by the propoxylation of a corresponding mixture of water and trimethylolpropane. The NCO/OH equivalent ratio during the preparation of the NCO prepolymer was 2:1.

DETDA: a mixture of 65% of 1-methyl-3,5-diethyl-2,4-diaminobenzene and 35% of 1-methyl-3,5-diethyl-2,6-diaminobenzene.

Internal mold release agent: a commercial internal mold release agent (PU 0733 A, available from Bayer AG).

Castor oil 62 parts of the aminopolyether, 30 parts of DETDA, 6 parts of internal mold release agent and 2 parts of castor oil are mixed together to form a "reactive component".

This reactive component is worked up with the above mentioned polyisocyanate component in a high pressure piston dosing apparatus of Maschinenfabrik Hennecke GmbH, D-5205 St. Augustin while an isocyanate index of 105 is maintained. The mold used was a plate mold of steel measuring 350×350×4 mm, the internal walls of which had been coated with a commercial external mold release agent (Chemtrend RCTW 2006 available from Chemtrend) before the contents were introduced into the mold.

Operating conditions:
Operating pressure: 200/200 bar
temperature of reactive component: 60° C.
temperature of polyisocyanate component: 50° C.
temperature of mold: 65° C.
dwell time in mold: 30 sec.

The plate formed was preheated to 180° C. in a heating cupboard and immediately thereafter molded in a deep-drawing mold at a press temperature of 180° C. The deep drawing process proper lasted 25 seconds. The deep-drawn molded article was then left in the deep-drawing mold for 5 minutes at the same temperature and under a pressure of 200 bar. It was then removed from the mold while hot and left to cool outside the mold. The molded article showed no signs of shrink-back. The cycle time was 6 min.

Comparison Example 1

A plate produced in exactly the same manner as in Example 1 was used. It was again preheated to 180° C. in a heating cupboard and then pressed in a deep-drawing mold at 180° C. The deep-drawing process lasted 25 seconds. The pressure and temperature conditions were maintained for a further 5 minutes. The molded product was then cooled inside the deep-drawing mold for 10 minutes while the pressure was maintained. The cycle time was 16 minutes.

Example 2

A plate measuring 350×350×4 mm was produced by the RIM process from the following formulation containing carbon black:

Polyamine component: the polyamine component used was a mixture of 67 parts of an aminopolyether with NH number 44 prepared by the hydrolysis of an isocyanate prepolymer at 90° C., using a mixture of 3,500 parts by weight of dimethylformamide, 0.1 parts by weight of sodium hydroxide and 100 parts by weight of water per 1,000 parts by weight of the prepolymer, followed by distillative removal of the volatile constituents. The isocyanate prepolymer had an NCO content of 3.4% and had been obtained by the reaction of 2,4-diisocyanatotoluene with an excess quantity of a polyether mixture. The polyether mixture consisted of equal parts by weight of (i) the propoxylation product with OH number 56 and OH functionality 2.4 of a mixture of water and trimethylolpropane and (ii) a polyether polyol with OH number 35 prepared by the propoxylation of glycerol followed by ethoxylation of the propoxylation product (ratio by weight PO:EO=87:13), 26 parts of a mixture of 65 parts of 1-methyl-3,5-diethyl-2,4-diaminobenzene and 35 parts of 1-methyl-3,5-diethyl-2,6-diaminobenzene, 5 parts of polyricinoleic acid having an acid number <5, 1 part of L 5304 of Union Carbide (polyetherpolysiloxane stabilizer), 1 part of carbon black, 3 parts of internal mold release agent PU 0733 of Bayer AG.

42.4 parts of ground staple glass fibers (MF 7901 of Bayer AG) were stirred into the clear solution of the components listed above.

Polyisocyanate component:

A mixture of 50 parts of a modified 4,4'-diisocyanatodiphenylmethane with NCO content 19% prepared by the reaction, in a molar ratio of 1:1, of 4,4'-diisocyanatodiphenylmethane with a polyester having an OH number of 56 of adipic acid, ethylene glycol and 1,4-butanediol, and 50 parts of a polyisocyanate mixture of the diphenylmethane series having an NCO content of 31%, consisting of 66% of 4,4'-diisocyanatodiphenylmethane, 2% of 2,4'-diisocyanatodiphenylmethane and 32% of higher functional homologues of these diisocyanates.

The polyamine and polyisocyanate components were introduced into a high pressure apparatus in a ratio by weight of 100:49 (NCO index=110) and then rapidly introduced, after intensive mixing in a force-controlled mixing head, into a heatable metal mold whose internal walls had been treated as described above. The steel plate mold is designed for the production of test plates measuring 350×350×4 mm. The reaction components were introduced into the mold from the long side by a direct gate.

The plate formed was preheated to 170° C. in a heating cupboard and immediately thereafter molded in a deepdrawing mold at a press temperature of 170° C. The deepdrawing process proper lasted 25 seconds. The deep-drawn molded article was then left in the deep-drawing mold for 5 minutes under the same temperature and pressure conditions, removed from the mold while hot and left to cool outside the mold. The molded article showed no signs of after-shrinkage. The cycle time was 6 minutes.

Comparison Example 2

A second plate was formed using the same process as in Example 2. The plate was pretreated and deep drawn under the same conditions as in Example 2. The pressure and temperature were then maintained for 5 minutes and the molded product was thereafter cooled down inside the deep-drawing mold for 8 minutes while the pressure was maintained. The cycle time was 14 min.

Example 3

Polyurethane(urea) material, which was produced as described in Example 1, was pre-fragmentized to a fragment size of 3 to 5 cm edge length. It was then cut in a cutting mill (manufactured by Pallmann, Type PS4-5) to a particle size of about 3 mm. The granules thus produced had a bulk density of about 0.5 gm/cm$^3$. These granules were preheated in a drying cabinet for a period of 15 minutes and then introduced directly into a pressing mold (manufactured by Schwabenthan, Type 200 T) and pressed at a pressure of 200 bars. After a residence time of 5 minutes at a pressure of 100 bars, during which the existing temperature was maintained, the molded article was removed from the mold and allowed to cool outside the mold. The article was a very good replica and did not display any after shrinkage. The specific gravity of the molded article was about 1.2 g/cm$^3$.

Comparison Example 3

Example 3 was repeated except that the part was cooled to 40° C. in the mold for ten minutes at a pressure of 200 bar. The quality of the article was not better than that gained by the inventive process, but the cycle time was reduced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of molded articles by deep-drawing a prefabricated polyurethane(urea) part or by pressing a fragmented polyurethane(urea) material produced from a polyisocyanate polyaddition product having a specific gravity of at least 0.8 g/cm$^3$, wherein said part is placed inside a deep-drawing mold or the fragmented material is introduced into a pressing mold and pressed at a temperature of up to 230° C. and a pressure of up to 1000 bar, the improvement wherein said part is subjected after the deep-drawing or pressing process to a dwell time of at least 10 seconds at a pressure of up to 1000 bar while maintaining the temperature and is immediately thereafter removed from the mold.

2. The process of claim 1 wherein said dwell time is from 2 to 10 minutes.

3. The process of claim 1 wherein said dwell time is from 3 to 5 minutes.

* * * * *